(12) United States Patent
McCaffrey et al.

(10) Patent No.: US 9,505,145 B2
(45) Date of Patent: Nov. 29, 2016

(54) HYBRID PART MADE FROM MONOLITHIC CERAMIC SKIN AND CMC CORE

(71) Applicant: UNITED TECHNOLOGIES CORPORATION, Hartford, CT (US)

(72) Inventors: Michael G McCaffrey, Windsor, CT (US); John E Holowczak, S. Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 9 days.

(21) Appl. No.: 14/524,065

(22) Filed: Oct. 27, 2014

(65) Prior Publication Data

US 2015/0042023 A1  Feb. 12, 2015

Related U.S. Application Data

(62) Division of application No. 13/173,269, filed on Jun. 30, 2011, now Pat. No. 8,939,728.

(51) Int. Cl.

| | |
|---|---|
| *B28B 23/02* | (2006.01) |
| *F01D 5/28* | (2006.01) |
| *F01D 5/30* | (2006.01) |
| *C04B 35/80* | (2006.01) |
| *B28B 7/18* | (2006.01) |
| *B28B 1/00* | (2006.01) |
| *B28B 1/14* | (2006.01) |
| *B28B 11/24* | (2006.01) |

(Continued)

(52) U.S. Cl.
CPC .............. *B28B 23/02* (2013.01); *B28B 1/008* (2013.01); *B28B 1/14* (2013.01); *B28B 7/18* (2013.01); *B28B 11/243* (2013.01); *B28B 23/0006* (2013.01); *C04B 35/565* (2013.01); *C04B 35/584* (2013.01); *C04B 35/80* (2013.01); *C04B 35/803* (2013.01); *C04B 35/806* (2013.01); *F01D 5/28* (2013.01); *F01D 5/282* (2013.01); *F01D 5/284* (2013.01); *F01D 5/3084* (2013.01); *C04B 2235/36* (2013.01); *C04B 2235/5244* (2013.01); *C04B 2235/5248* (2013.01); *C04B 2235/602* (2013.01); *C04B 2235/614* (2013.01); *C04B 2235/616* (2013.01); *F05D 2230/21* (2013.01); *F05D 2300/2102* (2013.01); *F05D 2300/224* (2013.01); *F05D 2300/2261* (2013.01); *F05D 2300/2283* (2013.01); *F05D 2300/6033* (2013.01)

(58) Field of Classification Search
CPC ....... C04B 35/80; B82B 1/008; B82B 23/02; B82B 1/14; B82B 7/18; B82B 11/243; B82B 23/0006

See application file for complete search history.

(56) References Cited

U.S. PATENT DOCUMENTS

| | | |
|---|---|---|
| 2,783,966 A | 3/1957 | Sorensen |
| 5,855,828 A | 1/1999 | Tuffias et al. |

(Continued)

OTHER PUBLICATIONS

European Search Report for EP 12173612.8 dated Jun. 29, 2016.

*Primary Examiner* — Angela Ortiz
*Assistant Examiner* — Russell Kemmerle, III
(74) *Attorney, Agent, or Firm* — Bachman & LaPointe, P.C.

(57) ABSTRACT

A hybrid part for use in a gas turbine engine has a platform and an attachment feature. The platform and an exterior portion of the attachment feature are formed from a monolithic ceramic material. A ceramic matrix composite material is located adjacent interior portions of the platform and the attachment feature and is bonded to the monolithic ceramic material.

10 Claims, 2 Drawing Sheets

(51) Int. Cl.
   *B28B 23/00* (2006.01)
   *C04B 35/565* (2006.01)
   *C04B 35/584* (2006.01)

(56) References Cited

U.S. PATENT DOCUMENTS

| | | |
|---|---|---|
| 6,200,092 B1 | 3/2001 | Koschier |
| 6,514,046 B1 | 2/2003 | Morrison et al. |
| 6,696,144 B2 | 2/2004 | Holowczak et al. |
| 8,939,728 B2* | 1/2015 | McCaffrey ................ F01D 5/28 416/230 |
| 9,103,633 B2* | 8/2015 | Holowczak ........... F41H 5/0414 |
| 9,212,560 B2* | 12/2015 | McCaffrey .............. F01D 5/147 |
| 2011/0027098 A1* | 2/2011 | Noe ...................... C04B 35/573 416/241 B |
| 2013/0004325 A1* | 1/2013 | McCaffrey ................ F01D 5/28 416/241 B |
| 2013/0004326 A1* | 1/2013 | McCaffrey .............. F01D 5/147 416/241 B |

\* cited by examiner

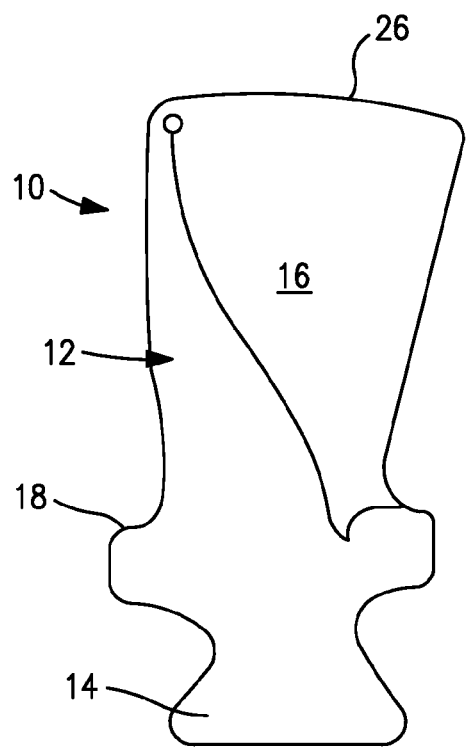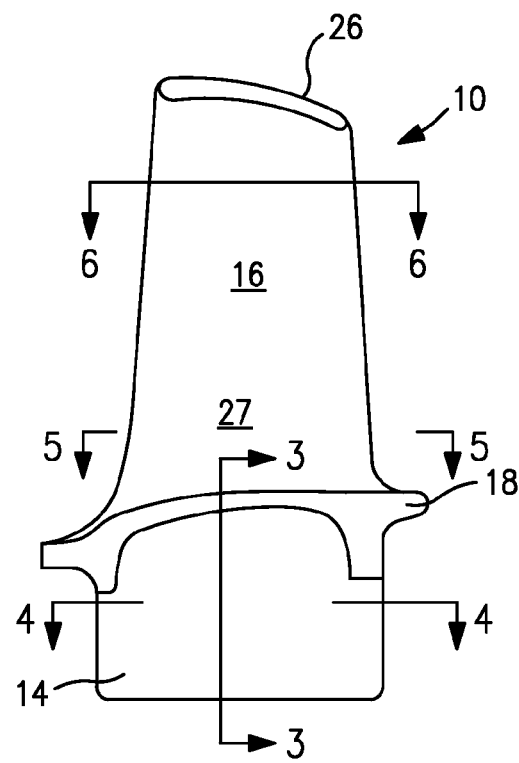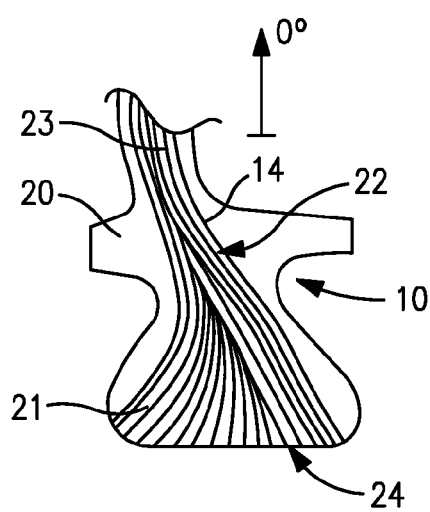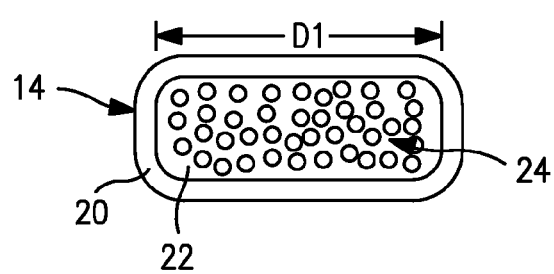
FIG. 1
FIG. 2
FIG. 3
FIG. 4

HYBRID PART MADE FROM MONOLITHIC CERAMIC SKIN AND CMC CORE

CROSS REFERENCE TO RELATED APPLICATION(S)

This application is a divisional application of pending U.S. patent application Ser. No. 13/173,269, filed Jun. 30, 2011, entitled "Hybrid Part Made From Monolithic Ceramic Skin and CMC Core".

BACKGROUND

The present disclosure is directed to a hybrid part, such as a turbine blade or vane, which is made from a monolithic ceramic skin and a ceramic matrix composite (CMC) core.

Currently, parts, such as turbine blades and vanes, for use in turbine engine components are made from metallic materials. Such parts are exposed to high temperatures during their service life. To increase their life, it is necessary to provide the parts with internal cooling circuits which may cause a decrease in engine efficiency.

Interest has been expressed in the development of parts using ceramic materials. This is because parts formed from ceramic materials can withstand high temperatures without any need for internal cooling.

SUMMARY

In accordance with the present disclosure, there is provided a hybrid part broadly comprising an attachment feature, an exterior portion of said attachment feature being formed from a monolithic ceramic material, and a ceramic matrix composite material located adjacent interior portions and said attachment feature and being bonded to said monolithic ceramic material.

Further, in accordance with the present disclosure, there is provided a method for forming a hybrid part. The method broadly comprises the steps of: casting or shaping a shell having an attachment feature with a core passage located internally of said attachment feature, said casting step comprising forming or shaping said shell from a monolithic ceramic material powder, densifying said shell, drawing a ceramic matrix composite material preform through the core passage, and bonding the ceramic composite material preform to an interior wall of the monolithic ceramic material forming the shell.

Other details of the hybrid part made from monolithic ceramic skin and a ceramic matrix composite core are set forth in the following detailed description and the accompanying drawings wherein like reference numerals depict like elements.

BRIEF DESCRIPTION OF THE DRAWINGS

FIG. 1 is an end view of a part in accordance with the present disclosure;

FIG. 2 is a side view of the part of FIG. 1;

FIG. 3 is a sectional view taken along lines 3-3 in FIG. 2;

FIG. 4 is a sectional view taken along lines 4-4 in FIG. 2;

DETAILED DESCRIPTION

Figure 5:
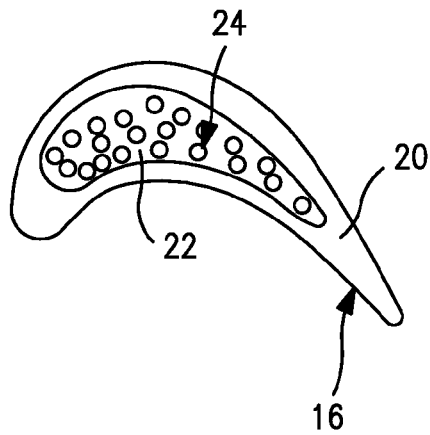
FIG. 5 is a sectional view taken along lines 5-5 in FIG. 2.

Referring now to the drawings, there is shown in FIGS. 1 and 2 a hybrid part 10 for use in a gas turbine engine. The hybrid part 10 may be a blade or a vane. The hybrid part 10 includes an attachment feature portion 14, such as a dovetail portion and a platform 18. The attachment feature portion 14 and the platform 18 each comprise a shell 20 formed from a cast monolithic ceramic material. Suitable materials which may be used to form the shell 20 include, but are not limited to, silicon nitride and/or silicon carbide.

As can be seen from FIG. 3, a core passage 22 is located within the shell 20 forming the attachment feature portion 14 and the platform 18. As shown in FIGS. 3-6, the core passage 22 extends continuously from a base end 21 of the hybrid part to a region adjacent a tip portion 26 of the hybrid part 10. As shown in FIG. 4, the core passage 22 has a first chordwise dimension D1 in the attachment feature portion region. As can be seen from FIG. 6, the core passage 22 has a second chordwise dimension D2 in the region adjacent the tip portion 26, which second chordwise dimension D2 is smaller than the first chordwise dimension D1. Thus, the core passage 22 tapers from a region 27 in proximity to the platform 18 to the region adjacent the tip portion 26.

Located within the central core passage 22 is a ceramic matrix composite material 23. The ceramic matrix composite material may comprise a plurality of fibers 24. The fibers 24 may be formed from a collection of individual fibers such as silicon carbide, carbon, and/or a monofilament fiber. The monofilament fiber consists of a central carbon fiber core and a silicon carbide outer layer. The fibers 24 may be laid in any spanwise direction, but typically they are primarily configured as 0° fibers. The fibers 24, after densification and pyrolysis with a silicon carbide ceramic matrix or a glass matrix, form an internal spar which is bonded to an interior surface 19 of the shell 20 and which helps strengthen the part.

The densification process can consist of several types of processes or combination of different processes to achieve a final ceramic matrix with 0-5% residual porosity, and preferably 0-2% residual porosity. The densification processes can be Polymer pre-impregnation, polymer infiltration and pyrolysis (PIP), chemical vapor infiltration (CVI), chemical vapor deposition (CVD), glass injection, glass infiltration, metal melt infiltration or metal reaction infiltration.

Polymer pre-impregnation and PIP both use a form of polymer resin that will decompose into ceramic material upon exposure to high temperatures. For pre-impregnation, the resin is applied to the fibers before insertion into the core, and for PIP the polymer is added after they are installed into the core. Due to the chemical conversion of the polymer during heating, some reduction in volume of the resulting ceramic matrix occurs and results in cracking and porosity. Multiple PIP cycles may be used after the first pre-impregnation or PIP cycle to fill the voids and reduce the porosity.

Chemical vapor infiltration and chemical vapor deposition are similar processes where the ceramic matrix constituents are transported to the fibers by a vapor cloud. Build up of the ceramic matrix occur as layer upon layer of molecules are added to the existing fibers and matrix. In some cases individual atomic species are deposited, but more often two or more atomic species in vapor react and deposit out onto the fibers. CVI/CVD can be used before and/or after pre-impregnation or PIP cycles to reduce porosity.

Glass infiltration and glass injection involve adding a glass matrix into the fibers. In the glass infiltration the glass may be added to the fibers in a powder form then allowed to melt into the fibers under heat. In glass injection, hot glass matrix flows or is forced into the fibers. In both cases, after the temperature is reduced the glass solidifies and forms the glass/fiber structure. Final processing may include crystallization of the glass matrix.

Metal melt infiltration and metal reaction infiltration involve the addition of a metal, typically silicon, into an existing ceramic matrix to fill the residual porosity that may be present after the polymer pre-impregnation, PIP, CVI or CVD processes. In the metal melt infiltration process liquid silicon or other metals fills the open porosity in the fiber preform. In the metal reaction infiltration, liquid metal chemically reacts with excess elements within the ceramic matrix to form additional ceramic matrix material. Typically liquid silicon reacts with excess carbon to form silicon carbide.

Referring now to FIG. 4, there is shown a sectional view of the attachment feature portion 14 of the hybrid part 10. As can be seen from this figure, the hybrid part 10 in this region has the monolithic ceramic material shell 20 with the central core passage 22 and the fibers 24 forming the ceramic matrix composite material positioned within the central core passage 22.

Referring now to FIG. 5, there is shown a sectional view of an airfoil portion 16 of the part taken at the approximate mid-span of the airfoil portion. As before, the hybrid part 10 is characterized by a monolithic ceramic material shell 20 with a central core passage 22 and the ceramic matrix composite material fibers 24 positioned within the central core passage 22.

Figure 6:
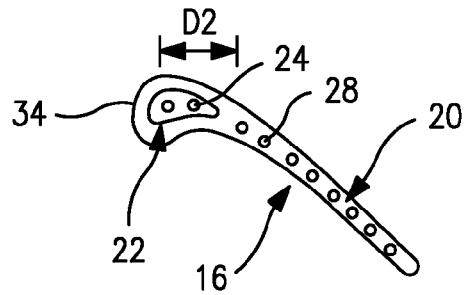
FIG. 6 is a sectional view taken along lines 6-6 in FIG. 2.

Referring now to FIG. 6, there is shown a sectional view of the airfoil portion 16 in a region proximate to the airfoil tip portion 26. As shown in the figure, the part 10 has a ceramic shell 20 with a smaller central core passage 22 in the vicinity of the leading edge 34 of the part 10 and the fibers 24 positioned within the central core passage 22. As a result of the tapering of the core passage 22, the airfoil portion 16 of the blade is primarily formed from the ceramic matrix composite material which comprises fibers 28 of the ceramic matrix composite material embedded within the shell 20.

The design of the hybrid part 10 has merit because it is a simpler design as compared to a complete ceramic matrix composite blade, platform and attachment feature.

Figure 7:
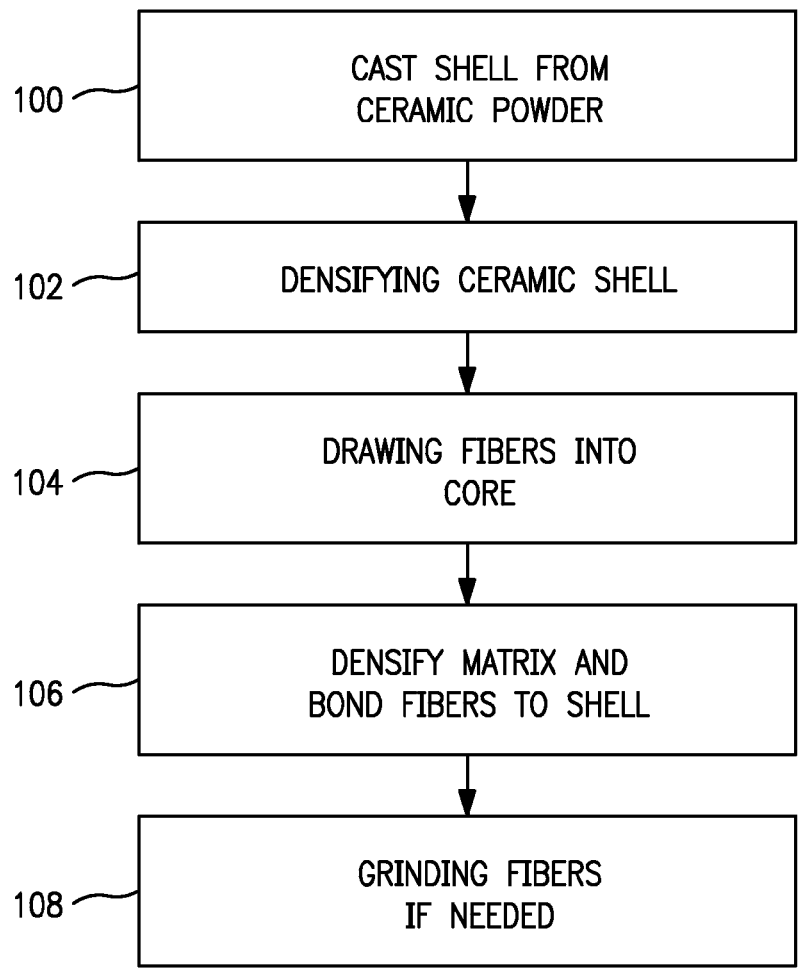
FIG. 7 is a flowchart of a method for forming the part of FIG. 1.

Referring now to FIG. 7, the part 10 may be formed in step 100 by first casting or shaping the shell 20 from a monolithic ceramic material in powder form. The ceramic material may be placed into a mold so that the shell 20 is formed with the attachment feature and the platform. Additional features such as damper pockets may be provided if desired. The shell 20 is formed with the core passage 22 having openings at each end.

The ceramic material within the mold may be fully densified in step 102 using any technique known in the art, which include, but are not limited to, sintering, gas pressure sintering, reaction sintering, reaction bonding hot isostatic pressing, hot pressing, and infiltration techniques. The resulting shell 20 is formed from an isotropic material.

After densification, in step 104, the fibers 24 formed from a ceramic matrix composite material preform, with a polymer precursor applied to the fibers 24, may be drawn into the open core passage 22. Prior to insertion, the fibers 24 may be formed into an core preform shape using a low temperature molding process such as, but not limited to, autoclave, compression molding, or resin transfer molding.

In step 106, the ceramic matrix composite material preform with the fibers 24 and the shell 20 may be subjected to a pyrolysis technique to densify the matrix and bond the ceramic matrix composite material with the fibers 24 to the shell 20. The polymer precursor applied to the fibers partially infiltrates the monolithic ceramic forming the shell 20 during the pyrolysis. A strong bond is formed between the monolithic ceramic material forming the shell 20 and the fibers 24 forming the spar.

In lieu of a pyrolysis technique, the fibers 24 may be subjected to a chemical vapor deposited matrix. For example, a silicon carbide ceramic matrix may be deposited on the fibers 24. Alternatively, a glass injected or glass infiltrated matrix may be used for lower temperature applications and/or lower cost.

Following densification, in step 108, any fibers 24 protruding from the tip portion 26 of the hybrid part 10 or the attachment feature 14 of the hybrid part 10 may be ground away if needed.

A hybrid part formed in accordance with the instant disclosure may be characterized by a high fracture toughness in the radial and bending modes, a simple load path in the ceramic matrix composite, and highly repeatable features. Since ceramic powders are substantially cheaper to make than ceramic fibers, the reduction in the use of fibers would drop the raw material cost considerably. Add in the reduction in ply layup time, cutting fabric, weaving the fabric, the cost of manufacturing and risk drop again. Further, it should be noted that monolithic ceramics are five to ten times stronger than composite matrix materials. Therefore, the complex features on the part are quite strong. The features are less prone to fracture. The tough core formed by the ceramic matrix composite material helps protect the part from fracture during service events.

A blade or vane formed by method of the present disclosure may be characterized by thin sections, such as thin leading and trailing edges.

While the part has been described in the context of a blade or vane used in the gas turbine engine, other parts can be formed using the technique described herein. For example, the technique described herein may be used to form combustor liners, panels and/or bonded features.

There has been provided in accordance with the instant disclosure a hybrid part made from a monolithic ceramic skin and a ceramic matrix composite core. While the part of the present invention has been described in the context of specific embodiments thereof, other unforeseen alternatives, modifications, and variations may become apparent to those skilled in the art having read the foregoing description. Accordingly, it is intended to embrace those alternatives, modifications, and variations as fall within the broad scope of the appended claims.

What is claimed is:

1. A method for forming a hybrid part comprising the steps of:
   casting or shaping a shell having an attachment feature with a core passage located internally of said attachment feature, said core passage extends from said attachment feature to a tip, wherein said core is exposed at said tip;
   said casting or shaping step comprising forming said shell from a monolithic ceramic material powder;
   densifying the shell;
   drawing a ceramic matrix composite material preform through the core passage; and
   bonding the ceramic matrix composite material preform to an interior wall of the monolithic ceramic material forming the shell.

2. The method of claim 1, wherein said casting step further comprises forming said core passage as a passage which tapers from a portion adjacent a platform to said tip portion of said part.

3. The method of claim 1, further comprising forming an airfoil portion of said part primarily from said ceramic matrix composite material.

4. The method of claim 1, wherein said bonding step comprises using a polymer infiltration and pyrolysis technique to bond said ceramic composite material to said interior wall.

5. The method of claim 1, wherein said bonding step comprises using a chemical vapor deposited silicon carbide ceramic matrix.

6. The method of claim 1, wherein said bonding step comprises using a glass injected matrix.

7. The method of claim 1, wherein said bonding step comprises using a glass infiltrated matrix.

8. The method of claim 1, wherein said casting step comprises placing said monolithic ceramic material in powder form in a mold and densifying said monolithic ceramic material to form said shell.

9. The method of claim 1, wherein said drawing step comprises drawing ceramic fibers coated with a polymer precursor into the core passage.

10. The method of claim 1, wherein said ceramic matrix composite material comprises a plurality of fibers protruding from said tip and said method further comprises grinding off any protruding one of said fibers.

* * * * *